Aug. 3, 1954

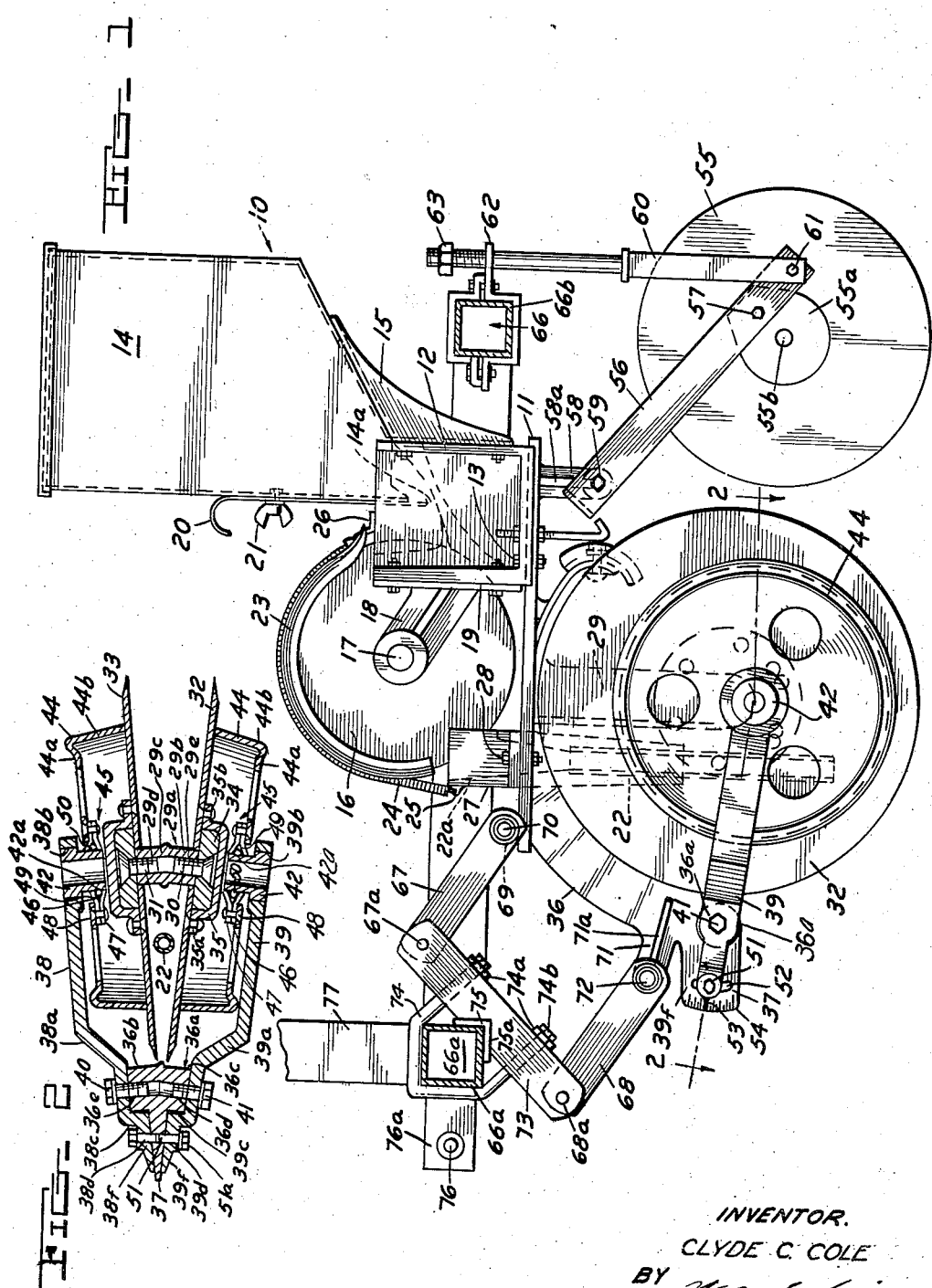

C. C. COLE 2,685,243

DEPTH WHEEL FOR SEED PLANTERS

Filed Feb. 15, 1950

INVENTOR.
CLYDE C. COLE
BY
ATTORNEY

Patented Aug. 3, 1954

2,685,243

UNITED STATES PATENT OFFICE 2,685,243

DEPTH WHEEL FOR SEED PLANTERS

Clyde C. Cole, Ventura, Calif., assignor, by mesne assignments, to Ford Motor Company, Dearborn, Mich., a corporation of Delaware Application February 15, 1950, Serial No. 144,212

2 Claims. (Cl. 97—189)

This invention relates to an improved adjustable depth wheel for a seed planting implement.

In seed planting machines that handle more than one variety of seed it is necessary to adjust the depth to which any particular variety of seed is planted. Obviously if the seed is planted too deeply, germination and subsequent emergence of the seedling from the soil is exceedingly slow, and not infrequently a large percentage of the seedlings fail to survive. Conversely, if the seed are not planted in a furrow of adequate depth germination will be spotty and subsequent plant growth may be affected. Furthermore, non-uniformity of planting depth in a given row produces unevenness of growth of the plants with possible reduction of crop yield. Therefore, it is essential that a seed planter deposit the seed in a furrow of uniform depth throughout the row and to an optimum depth for the seed being planted.

Accordingly, it is an object of this invention to provide an improved adjustable depth wheel for a seed planting implement which will control the depth of furrow in which the seed are deposited with an unusual degree of accuracy.

Another object of this invention is to provide a depth wheel for a seeder which may be conveniently adjusted to any desired planting depth by a single fastening device.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of a planter incorporating the adjustable depth wheel of this invention.

Figure 2 is a cross sectional view taken along the line 2—2 of Figure 1.

As shown on the drawings:

Figure 3:
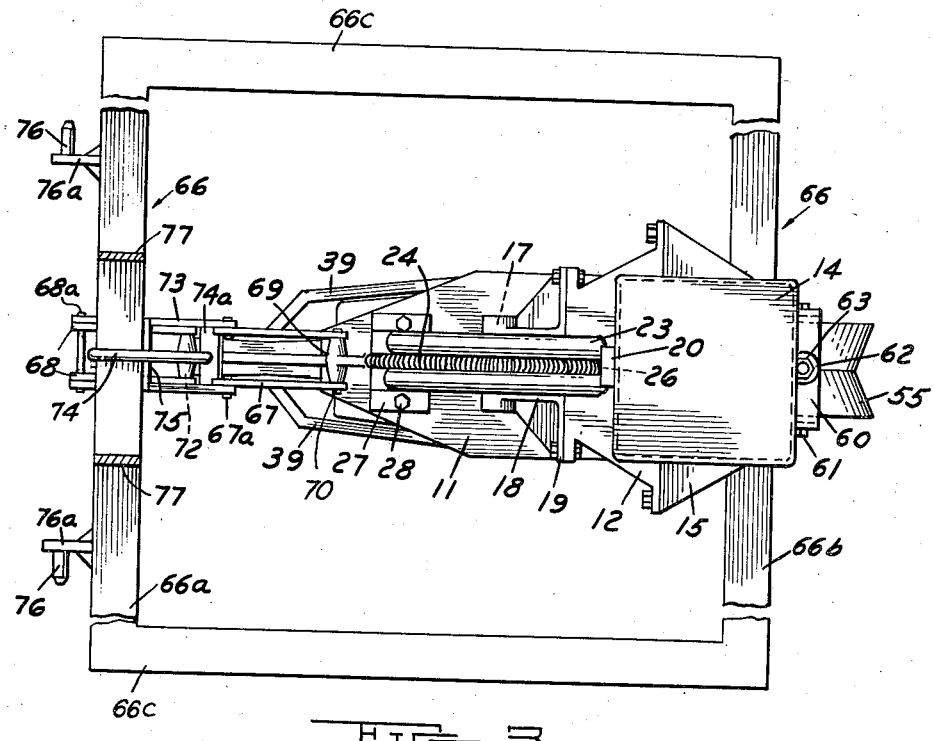
Figure 3 is a plan view of Figure 1.

In Figure 1 there is shown in assembled relation a seed planter 10 of the general type described and claimed in the co-pending application of Hermann Wechsler, Serial No. 124,018, filed October 28, 1949, and assigned to the assignee of this application. Planter 10 comprises a horizontal frame 11 provided with a secondary seed hopper mounted on and adjacent the rear end of frame 11 and secured to such horizontal frame by bolts 13. A primary seed hopper 14 of substantially greater volume than secondary seed hopper 12 is mounted above and adjacent to such hopper on a bracket 15 welded to the underside of primary hopper 14 and to the rear face of secondary hopper 12. A seed selecting wheel 16 is mounted on a transverse axle 17 rotatably mounted by a pair of forwardly projecting spaced brackets 18 integrally formed on the forwardly facing side plate 19 of secondary seed hopper 12.

The periphery of seed wheel 16 rotates within secondary seed hopper 12 entering hopper 12 through a suitable vertically disposed slot (not shown) provided in the front wall of such hopper. A vertically slidable gate 20 cooperates with a discharge opening 14a in primary hopper 14 to regulate the flow of seed into secondary hopper 12 and is adjustably secured by a bolt and thumb nut 21 to the forwardly facing side of primary hopper 14. Around its periphery, the seed wheel 16 has a plurality of spaced pockets (not shown). Seed wheel 16 thus selects seed from the secondary hopper 12 and carries the seed around its periphery and deposits such seed in a vertically disposed seed depositing tube 22 which is supported near the forward edge of frame 11 and beneath the extreme forward peripheral edge of seed wheel 16. A transparent cover 23 surrounds the upper periphery of seed wheel 16 and a spring 24 secured at one end to an apertured lug 25 provided on the forward face of seed tube 22 and surrounding cover 23 secures such cover in position about seed wheel 16. The other end of spring 24 is detachably secured to a bracket 26 provided on top of secondary hopper 12 as shown in Figure 1. Seed depositing tube 22 is supported in depending relation with respect to frame 11 within a vertically disposed housing 27 secured to the top of frame 11 by bolts 28. Housing 27 also projects downwardly below frame 11 for a substantial distance as shown in Figure 1 to more adequately support seed depositing tube 22. The upper end of seed depositing tube 22 adjacent seed wheel 16 is flared as shown at 22a to more readily receive the seeds deposited from seed wheel 16.

In accordance with this invention, a depending bracket 29 is integrally formed with frame 11 and disposed substantially in alignment with the axis of seed wheel 16. Bracket 29 terminates in a transverse hub portion 29a as best shown in Figure 2. Hub 29a defines two integral substantially cylindrical portions 29b and 29c each having its axis disposed at an angle with respect to the other. An axial threaded hole 29e and 29d is provided in respective hub portions 29b and 29c to receive screws 30 and 31, respectively.

A furrow opening disc 32 is rotatably mounted on cylindrical portion 29b of hub 29a and is secured thereto by a cylindrical block 34 which in turn is axially secured to the outside of disc 32 by screw 30. A cup-like member 35 provided with a peripheral flange 35a surrounds block 34 with flange 35a contiguous to the outside surface of disc 32. A plurality of rivets 35b traversing flange 35a and disc 32, secure member 35 to such disc. Thus disc 32 is rotatably mounted on the cylindrical portion 29b of hub 29a. A disc 33 similar to disc 32 is similarly mounted on the cylindrical portion 29c of hub 29a. Thus the cylindrical portions 29b and 29c of hub 29a function as stub axles. Due to the angular displacement of the axis of each cylindrical portion 29b and 29c the discs 32 and 33 will then be angularly disposed with the forward edges of such discs converging, whereby such discs are able to open a furrow in the ground for seed deposited by tube 22.

A bracket 36 integrally formed with frame 11 depends from the forward edge of frame 11 and is arcuately shaped to lie adjacent the upper forward periphery of discs 32 and 33. Bracket 36 terminates in a hub portion 36a and an integral, forwardly projecting, horizontally disposed lug 37 is provided on the forward end of hub 36a for a purpose to be presently explained. Hub portion 36a is constructed similar to hub 29a and defines two integral cylindrical portions 36b and 36c having their axes angularly disposed relative to one another and corresponding to the angular disposition of the cylindrical portions 29c and 29b of hub 29a. Axial threaded holes 36d and 36e are provided respectively in cylindrical portions 36c and 36b.

A pair of rearwardly projecting bearing arms 38 and 39 are rotatably secured to hub portion 36a by bolts 40 and 41 threaded respectively into holes 36e and 36d. Each bearing arm 38 and 39 is provided with an offset portion 38a and 39a thereby enabling such arms to be spaced outwardly of discs 33 and 32, respectively, and yet maintain such arms substantially parallel to discs 33 and 32. A transverse hole 38b is provided in the rear end of arm 38 with its axis in alignment with the axis of threaded hole 29d of hub 29a. A corresponding transverse hole 39b is provided in arm 39 and the axis of such hole is coincident with the axis of threaded hole 29e of hub 29a. Flange type bearings 42 are inserted respectively in transverse holes 38b and 39b and bearings 42 are provided with exterior annular ball bearing races or grooves 42a, such races being located near the inner ends of such bearings, as shown in Figure 2.

A depth wheel 44 is rotatably mounted on each bearing 42 and such wheels comprise a disc portion 44a having an integral peripheral flange 44b, such flanges 44b being disposed contiguously to the respective discs 33 and 32. A hub 45 comprising a pair of disc-like plates 46 and 47 are secured to discs 44a of wheels 44 by a plurality of rivets 48. Plates 46 and 47 are each provided with a suitable axial aperture whereby such discs can be mounted on flange bearings 42 and the edge portion of each disc adjacent the axial aperture is flared outwardly whereby a V-shaped annular groove 49 is defined when such discs are assembled as shown in Figure 2. A plurality of balls 50 are contained within each V-shaped groove 49 and such balls cooperate with annular grooves 42a whereby each wheel 44 is rotatably supported on adjacent bearing 42.

Arms 38 and 39 are pivotally secured to hub portion 36a by bolts 40 and 41 as previously mentioned and each of such arms is provided with a forwardly projecting integral end portion 38f and 39f. Each of the forward end portions 38f and 39f is provided, respectively, with an inwardly offset portion 38c and 39c which permits such end portions to fit snugly against the respective sides of the forwardly projecting lug 37 of bracket 36. A vertically disposed arcuate slot 52 is formed in lug 37. Transverse holes 39d and 38d are provided in the forward end portions of arms 39 and 38, respectively, and such holes are in alignment to receive a bolt 51 which also passes through arcuate slot 52. Tightening of a nut 51a on bolt 51 permits the arms 38 and 39 to be locked in a desired angular position of adjustment.

Slot 52 permits vertical pivotal movement of arms 38 and 39 within the limits of such slot whereby the height of depth wheels 44 may be changed relative to the discs 32 and 33. If desired, an index pointer 53 may be integrally formed on the forward ends of portions 38f and 39f which cooperates with a plurality of radial graduation marks 54 provided on the forward edge of lug 37 whereby the depth of setting of the height of depth wheels 44 relative to opening discs 32 and 33 may be conveniently indicated.

The seed planter shown in Figure 1 is connected to a rectangular frame 66. While there is shown in Figure 3 only one planter connected to frame 66, it is desired to point out that a plurality of such seed planters may be readily mounted within frame 66 by merely extending the sides of such frame. Frame 66 is constructed of square tubular members comprising a forward transverse drawbar 66a and a trailing transverse bar 66b. Bars 66a and 66b are spaced apart by a pair of longitudinally extending side members 66c which complete the rectangular frame 66. The seed planting machine is connected to such frame in a manner as will be presently described.

Near the rear end of frame 11 there is provided a depending bracket 58 and a vertically disposed slot 58a is provided in such bracket to receive a bolt 59. A rearwardly and downwardly sloping arm 56 is pivotally secured to bracket 58 by the bolt 59 which is insertable through a suitable transverse aperture in such arm. Arm 56 is vertically adjustable within the limits of slot 58a and may be secured in any selected position therein by bolt 59. The lower end of arm 56 is pivotally secured to the bottom end of a vertically disposed strut 60 by a bolt 61. Strut 60 projects upwardly through a trailing bracket member 62 welded to rectangular frame 66 as best shown in Figure 1. Strut 60 is vertically slidable in the member 62 of frame 66 and the downward movement of strut 60 is limited by a nut 63 threaded on to the upper end of such strut. Adjustment of nut 63 vertically on strut 60 provides a convenient device for adjusting the downward extent of movement of strut 60.

A substantially circular plate member 55a is secured by a bolt 57 to arm 56 adjacent strut 60. A transverse stub axle 55b is secured to plate 55a as by welding and such stub axle rotatably supports a packing wheel 55 thereon. Packing wheel 55 is secured to stub axle 55b in any suitable fashion and such packing wheel functions to compact the earth surrounding the seed deposited in the furrow opened by discs 32 and 33 to insure proper germination of the seed.

The seed planter shown in Figure 1 is pivotally connected to the transverse drawbar 66a of frame 66 in the following manner: A pair of transversely spaced rectangular bars 73 are each provided with a V-shaped notch 75a in the center thereof as shown in Figure 1 and an angle shaped shoe 75 is transversely secured in such V-shaped notch by welding. Shoe 75 abuts the lower rear corner of rectangular drawbar 66a as shown in Figure 1 and, when so engaged with the lower rear corner, bars 73 are diagonally disposed with respect to drawbar 66a. Bars 73 are secured in such position to drawbar 66a by a U-bolt 74 which surrounds drawbar 66a and projects between bars 73. A pair of spaced clamp members 74a and a nut 74b placed on each threaded end of U-bolt 74 secure shoe 75 to bar 73.

An integral transverse lug 69 is provided on the forward end of frame 11 and a link 67 is pivotally secured on each side of such lug by a bolt 70. The other end of each link 67 is respectively secured to the upper end of bars 73 by a transverse pin 67a. An integral forwardly projecting lug 71 is provided on bracket 36 adjacent lug 37 and a rearwardly and downwardly sloping slot 71a is provided in lug 71. A pair of links 68 are pivotally secured at their lower ends to opposite sides of lug 71 by a bolt 72 cooperating with slot 71a while the upper end of each link 68 is respectively pivotally secured to corresponding bars 73 by a transverse pin 68a. Slot 71a permits positioning of the link 68 whereby the effective length of link 68 may be varied to alter the height of the seed planter relative to the ground for leveling the primary seed hopper 14.

The trailing draft links of a tractor of well known make (not shown) may be conveniently connected to drawbar 66a by assembly of such hitch links to a pair of transverse pins 76 horizontally welded to a respective pair of forwardly projecting lugs 76a welded to the forward face of drawbar 66a. An upright A-frame 77 shown broken away in Figure 1 is welded to the top of bar 66a. A top link member of the tractor (not shown) is pivotally connected to the top of A-frame 77 in the usual fashion.

In the operation of the seed planter shown in Figure 1, the depth wheel 44 is adjusted to the desired height above the bottom of furrow opening discs 32 and 33 by rotating arms 38 and 39 about bolts 40 and 41 respectively. Graduated scale 54 provided on lug 37 in cooperation with index point 53 on the ends of arms 38 and 39 provides a convenient means for setting the depth wheels 44 to the desired height. When positioned where desired, bolt 51 is tightened to lock such arms in the selected position. As the planter is moved along the ground, the furrow opening discs 32 and 33 bite into the ground and open a substantially V-shaped furrow, due to the forwardly converging relationship of such furrow opening discs. The depth wheels adjacent each disc 32 and 33 ride on the ground and because of the wide surface engagement with the ground such wheels not only limit the depth of penetration of the discs by supporting a substantial portion of the weight of the seeder but such discs level off the soil adjacent the furrow opening discs whereby a furrow only as deep as that portion of the discs extending below the depth wheels is opened. A greater or lesser penetration of furrow opening discs 32 and 33 is readily obtained by resetting depth wheels 44 to permit the furrow opening discs to project a greater or lesser distance below the bottom surface of depth wheels 44.

Packing wheel 55 trailing behind furrow opening discs 32 and 33 closes the furrow and compacts the soil firmly against the seed dropped into the furrow opened by the furrow opening discs 32 and 33 through the seed depositing tube 22. The vertically slidable strut 60 permits packing wheel 55 to follow any irregularities in the ground contour in order that such packing wheel will readily follow the furrow opening discs as such discs follow the contour of the ground.

It will thus appear from the foregoing description that this invention provides an adjustable depth wheel for a seed planter which may be conveniently and accurately set to a predetermined position of vertical adjustment relative to the furrow opening discs whereby the furrow opening discs will open a furrow of a desired depth. A positive locking device is provided to secure the adjustable depth wheels in the desired setting thereby insuring against any displacement of such wheels during planting. It will, therefore, be appreciated that a uniform depth of furrow for the reception of the seed will be consistently obtained by the use of a depth wheel constructed in accordance with this invention.

It will, of course, be understood that various details of construction may be varied through a wide range without departing from the principles of this invention and it is, therefore, not the purpose to limit the patent granted hereon otherwise than necessitated by the scope of the appended claims.

I claim:

1. In a seed planter having a vertically extending support bracket, a pair of generally oppositely directed stub axles projecting laterally therebeyond, said axles being forwardly divergent in a lateral plane, a pair of forwardly convergent furrow opening discs rotatably carried by said stub axles, respectively, a second bracket secured to said planter and extending ahead of said discs, a forwardly projecting lug on said second bracket having a vertically extending arcuate slot, a hub on said second bracket defining a pair of opposed bores respectively parallel to and displaced forwardly of the axes of said discs, a pair of pivot bolts insertable into said bores to project laterally beyond said hub for forward divergence in a direction generally parallel to said stub axles, a pair of rearwardly extending arms pivoted intermediate their lengths about said pivot bolts, said arms being disposed respectively in spaced parallel relationship to said discs and being vertically movable in planes parallel to the planes of said forwardly convergent discs, a forwardly projecting extension on each of said arms adapted to lie adjacent opposite sides of said lug, a cylindrical depth wheel rotatably mounted on the rear end of each arm, said depth wheels respectively lying in closely spaced parallel relation to the side surfaces of said discs and being respectively movable by said arms in a vertical plane parallel to the plane of said respective discs, and bolt means cooperable with said vertical arcuate slot for adjustably securing said forwardly projecting arm extensions to said lug.

2. In a seed planter having a vertically extending support bracket, a pair of generally oppositely directed stub axles projecting laterally beyond said support bracket, said axles being forwardly divergent in a lateral plane, a pair of forwardly convergent furrow opening discs rotatably carried by said stub axles respectively, a second bracket secured to said planter and extending ahead of said furrow opening discs, pivot means on said second bracket projecting laterally therebeyond to define a pair of pivot axes respectively parallel in a lateral plane to said stub axles on said support bracket, a pair of arms respectively having their medial portions pivoted on said pivot means and supported on opposite sides of said second bracket for movement about said axes in a generally vertical plane, the trailing ends of each of said arms lying adjacent the associated disc, means at the trailing ends of each of said arms defining an axis of rotation, a depth wheel rotatably mounted on the axis of rotation at the trailing extremity of each of said arms, respectively, in closely spaced parallel relation with the associated furrow opening disc, and means at the free forward ends of said arms cooperable with said second bracket for locking said arms in a selected position of vertical pivotal adjustment whereby said depth wheels are adjustable vertically in an arc about the pivot axes of said arms to limit the depth of penetration of said discs, respectively.

References Cited in the file of this patent

UNITED STATES PATENTS

| Number | Name | Date |
|---|---|---|
| 553,510 | Campbell | Jan. 28, 1896 |
| 2,332,012 | Rassmussen | Oct. 19, 1943 |
| 2,496,885 | Milton | Feb. 7, 1950 |

FOREIGN PATENTS

| Number | Country | Date |
|---|---|---|
| 789,740 | France | Aug. 26, 1935 |